(12) United States Patent
Davis et al.

(10) Patent No.: US 10,141,739 B1
(45) Date of Patent: Nov. 27, 2018

(54) SYSTEM FOR DISTRIBUTING DC POWER TO AND CONTROLLING BUILDING DEVICES

(71) Applicant: The Watt Stopper, Inc., Carlsbad, CA (US)

(72) Inventors: Jeffrey T. Davis, Carlsbad, CA (US); Jonathan P. Cartrette, Carlsbad, CA (US)

(73) Assignee: The Watt Stopper, Inc., Carlsbad, CA (US)

(*) Notice: Subject to any disclaimer, the term of this patent is extended or adjusted under 35 U.S.C. 154(b) by 92 days.

(21) Appl. No.: 15/166,078

(22) Filed: May 26, 2016

Related U.S. Application Data

(60) Provisional application No. 62/166,512, filed on May 26, 2015.

(51) Int. Cl.
*H02J 7/34* (2006.01)
*H02J 1/00* (2006.01)
*H02M 7/04* (2006.01)
*H05B 33/08* (2006.01)

(52) U.S. Cl.
CPC ............. *H02J 1/00* (2013.01); *H02M 7/04* (2013.01); *H05B 33/0809* (2013.01)

(58) Field of Classification Search
CPC .......... H02J 1/00; H05B 33/0809; H02M 7/04
See application file for complete search history.

(56) References Cited

U.S. PATENT DOCUMENTS

| | | | | |
|---|---|---|---|---|
| 2010/0007209 A1* | 1/2010 | Eppler | ................ | H02J 7/345 307/36 |
| 2010/0280676 A1* | 11/2010 | Pabon | ................ | G06F 1/266 700/295 |
| 2011/0090068 A1* | 4/2011 | Langer | ................ | G08B 3/10 340/333 |
| 2011/0109284 A1* | 5/2011 | Houston | ............ | H02M 3/1584 323/272 |
| 2011/0254530 A1* | 10/2011 | Hulett | ................ | H05B 33/089 323/318 |
| 2012/0146425 A1* | 6/2012 | Lee | ................ | H02J 5/005 307/104 |
| 2015/0180355 A1* | 6/2015 | Freeman | ............ | H02M 1/08 363/21.04 |

* cited by examiner

*Primary Examiner* — Alfonso Perez Borroto
*Assistant Examiner* — Esayas Yeshaw
(74) *Attorney, Agent, or Firm* — K. David Crockett, Esq.; Paul J. Backofen, Esq.; Crockett & Crockett, PC

(57) ABSTRACT

A scalable DC power distribution and control system suitable for commercial buildings includes one or more power and control hubs. Each DC power and control power hub provides power and control for any suitable distributed DC loads such as light-fixtures. AC power from the electric utility is applied to the power and control hub and is converted to DC power for distribution to DC loads within the space using low-voltage cables.

1 Claim, 6 Drawing Sheets

SYSTEM FOR DISTRIBUTING DC POWER TO AND CONTROLLING BUILDING DEVICES

RELATED APPLICATIONS

This application claims priority to U.S. Provisional patent application 62/166,512 filed May 26, 2015.

FIELD

The inventions described below relate to the field of powering and controlling devices located in building spaces.

BACKGROUND

Building power systems typically distribute alternating-current (AC) electrical power that is delivered by an electric utility. Some electrical devices inside the building are design to operate based upon AC electrical power, for example incandescent light fixtures. Many electrical devices within a building require direct-current (DC) electrical power to operate. A typical example is a lamp constructed using light emitting diodes (LEDs). Because most building power systems distribute AC power, devices requiring DC power typically are associated with a device-specific AC/DC converter. AC/DC converters, however, generate power losses and using a dedicated AC/DC converter for each device that runs on DC power multiplies the power loss. Additionally, when the power distribution within a building is AC, the power wires must generally be housed in conduits and raceways as a safety measure increasing complexity and expense as well as potentially detracting from room aesthetics.

SUMMARY

The devices and methods described below provide for a scalable DC power distribution and control system suitable for commercial buildings. A DC power and control power hub provides power and control for any suitable distributed DC loads such as light-fixtures. AC power from the electric utility is applied to the power and control hub and is converted to DC power for distribution to DC loads within the space using low-voltage cables. Thus, the power loss due to many different and inefficient AC/DC converters can be consolidated into a single, more efficient conversion to save energy and conduits and raceways can be omitted.

Low-voltage cables are also used to transmit data signals. The devices and methods described below provide an opportunity to both power and control a device with a single cable more efficiently than existing approaches such as Power over Ethernet (POE).

A system for controlling and distributing DC power includes a power hub having a hub controller, a power converter converting AC power to DC power, one or more variable voltage regulators operatively connected to the power converter and controlled by the hub controller, or more output ports, each of the one or more output ports operatively connected to each of the one or more variable voltage regulators for providing regulated DC power and for receiving and transmitting data and control signals to one or more primary loads, one or more communication interfaces operatively connected to the hub controller for transmitting and receiving data and control signals over a network. Connected to the power hub are one or more primary loads, each primary load operatively connected to one of the one or more output ports, each primary load having a load control module, the load control module having a load controller operatively connected to the hub controller for receiving and transmitting data and control signals to the hub controller, a plurality of output ports operatively connected to the load controller, the plurality of output ports providing DC power to secondary loads and transmitting and receiving data and control signals to and from the load controller and a load driver for distributing DC power to the primary load, the load driver operatively connected to and under control of the load controller.

DETAILED DESCRIPTION OF THE INVENTIONS

Figure 1:
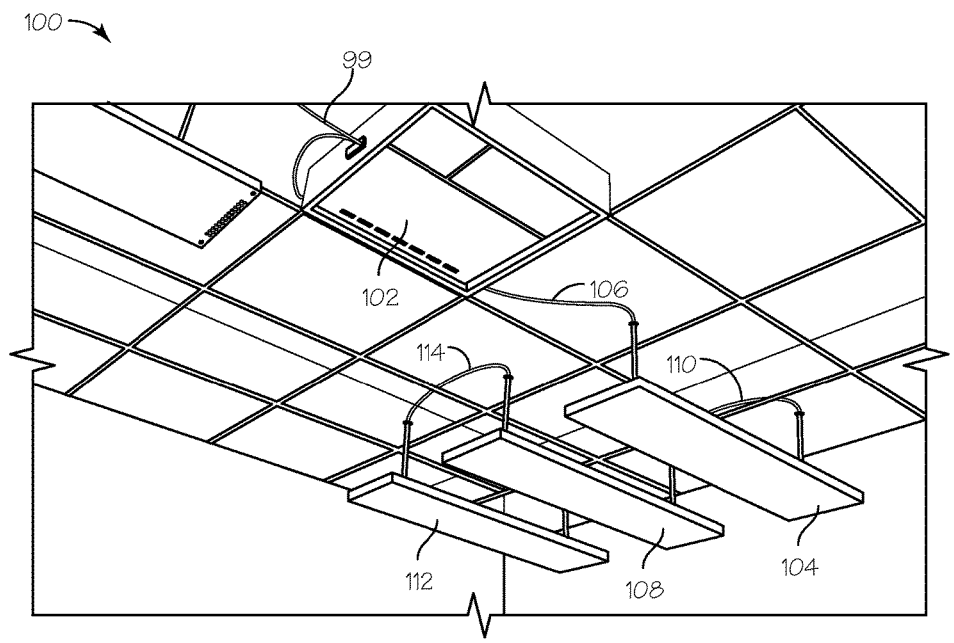
FIG. 1 is a perspective view of a power-distribution and control system.

FIG. 1 shows a perspective view of power-distribution and control system 100. The power-distribution and control system includes one or more power distribution hubs such as hub 102. Power distribution hubs such as hub 102 may be located in any suitable location such as on a ceiling, in a ceiling plenum, under a raised floor, on a wall, in a rack or enclosure mounted, or placed in a distribution closet for electrical or telecom equipment. Hub 102 is connected to AC power wires that are connected to the building AC power distribution system. An LED light fixture 104 is connected to the hub 102 through cable 106. As described in more detail below, cable 106 transmits both power and control signals from hub 102 to any suitable distributed DC loads such as light fixture 104. An LED light fixture 108 is connected to light fixture 104 through another cable 110. Cable 110 has the same construction as cable 104 but may differ in its length. An LED light fixture 112 is connected to light fixture 108 through cable 114. Cable 114 has the same construction as cables 106 and 110 but may differ in its lengths. The structure of cables 106, 110 and 114 is described in more detail below with reference to FIGS. 4A and 4B. Additional light fixtures or other DC loads can be added in a daisy-chain configuration with cables having the same construction as cables 106, 110, and 114. Distributed DC loads may be sensors, sound masking components, submetering components, emergency lighting components and occupancy density mapping components. Additionally, one or more additional light fixtures can be connected directly to hub 102 and additional light fixtures can be daisy-chained to the additional light fixtures that are directly connected to the hub using additional cables having the same construction as cables 106, 110, and 114. While the system 100 is shown and described as powering and controlling LED light fixtures, it should be understood that a system according to the present disclosure can control and power other types of light fixtures as well, for example, fluorescent light fixtures. Additionally, while system 100 is shown and described with one hub 102, it should be understood that a system according to the present disclosure can include multiple interconnected hubs that can communicate through each other through a building computer network.

Figure 2:
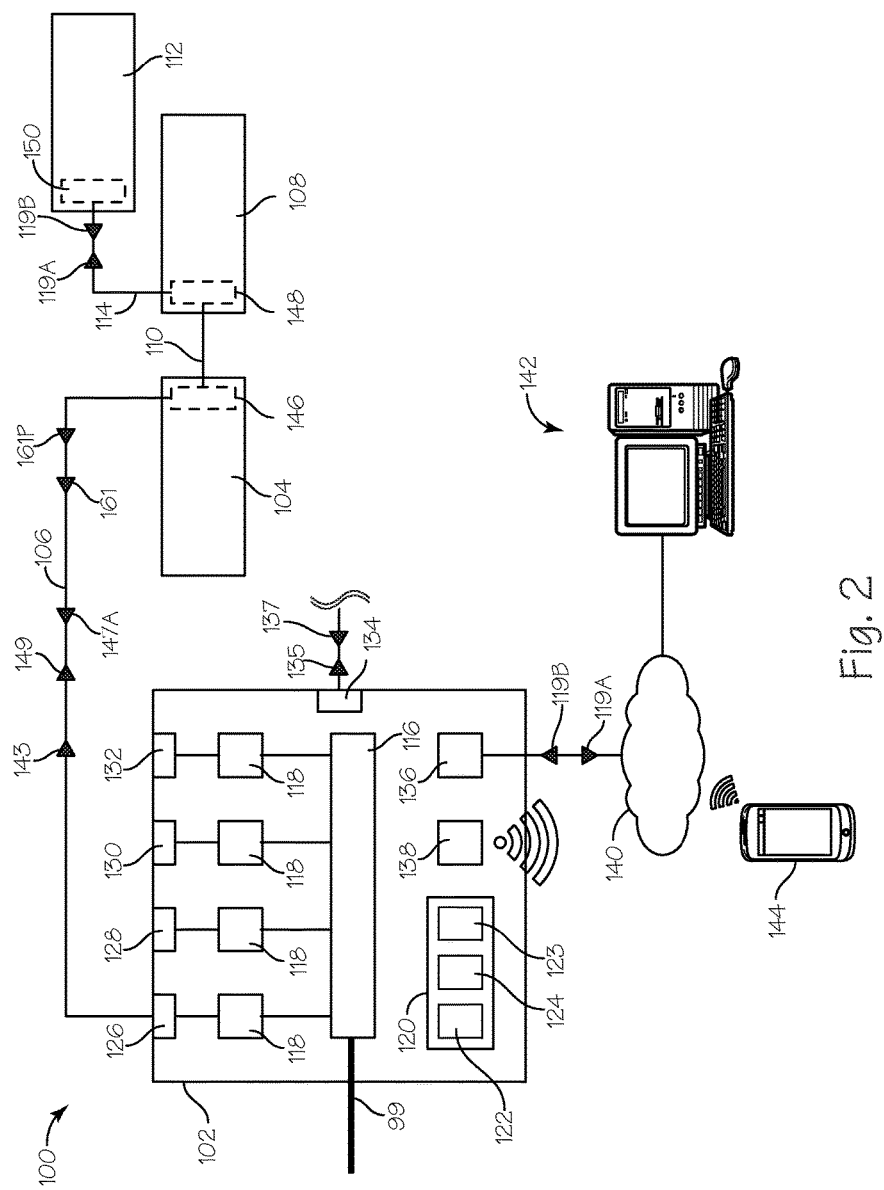
FIG. 2 is a schematic representation of the power-distribution and control system shown in FIG. 1.

FIG. 2 shows a schematic representation of the power-distribution and control system shown in FIG. 1. Hub 102 includes an AC/DC converter 116 that converts the AC power from the AC power wires 99 that are connected to Hub 102 into DC power that is used by the power-consuming devices in the system. Hub 102 also contains voltage regulators 118 that regulate the output voltage of the AC/DC converter. One voltage regulator stage per output connection is utilized to guarantee that amperage levels provided stay within safety NEC limits for Class 2 power. Voltage regulators 118 may be individual per port or combined on a common backplane or splitter board. Additionally each regulator stage utilizes current limiting to protect from both over current and short circuit events in a manner that does not damage the electrical components of hub 102 or any attached light fixtures or control devices.

Hub 102 also contains a controller 120 containing a memory 122 and one or more microprocessors such as microprocessor 124 and communication transceiver 123. The controller 120 controls the AC/DC converter 116 and the voltage regulators 118, and can also be used to control the entire system 100. Controller 120 administrates communication between light fixtures or control accessory devices connected physically or logically to hub 102 through communication transceiver 123 and output ports 126, 128, 130 and 132. Controller 120 also administrates wired and wireless communication with one or more network computers, other hubs and with workstations and mobile devices through communication transceiver 123 using wired network interface 136 and a wireless network interface 138 respectively. Having both wired and wireless communications capabilities enables the hubs and loads to determine which devices are physically close together as loads and controllers hard wired together are generally within 30-50 feet of each other and would be most likely to need to participate with the controller in application binding.

Controller 120 manages the list of control bindings that relate control accessory inputs to actuator events they assert including, but not limited to causing lights to turn on, off, or dim, and enabling or disabling other control accessory devices or subordinate systems such as sound masking or emergency signage. Communication addressing and message routing are able to work between a set of accessories, light fixtures, and other hub 102 functions without the requirement for a global or supervisory controller. Hub 102 also includes output ports 126, 128, 130, and 132 for distributing the DC power output by the AC/DC converter. Each output port can provide, for example, 100 W of power and Class II circuits currently allow up to 60 VDC. The output ports can be programmed to provide voltages from 12-60 VDC and each output port can output power at different voltage levels. For example, output port 126 and 128 can output 24V and ports 130 and 132 can output 48V. For ease of reference, four output ports are shown, but it should be understood that hub 102 can have more or less than four output ports. Hub 102 can also include one or more connections 134 for providing power and content signals such as power and content signal 135 to audio speakers as well as sending power and control signals 135 and receiving control signals and data 137 from secondary loads such as sensors or other suitable infrastructure components.

Hub 102 also includes a wired network interface 136 and a wireless network interface 138. Interfaces 136 and 138 can be used to connect hub 102 to a computer network 140. Network 140 can be a local area network (LAN) that utilizes the IEEE 802.11 or 802.3 standards family variants or a local control accessory device network utilizing IEEE 802.15.4 family technologies, sub Ghz RF, or BlueTooth variants including but not limited to Bluetooth Smart, BlueTooth Low Energy (BLE), and BlueTooth classic. Alternatively, the computer network 140 can be a wide-area network (WAN) such as the Internet. Through the computer network, hub 102 can communicate with other hubs or with a personal computer 142 or mobile device 144 running application software that performs one or more of the following functions: system configuration and management; real-time graphical display of system data (commonly referred to as "dashboarding"); data analytics; reporting; machine learning of the typical control functions of other hubs nearby to hub 102 for the purposes of real-time adaptive self programming of control operational sequences.

As shown in FIG. 2, each LED fixture 104, 108, 112 respectively includes a load control module 146, 148, 150. One end on each of cables 106, 110, 114 plugs directly into an input port on the respective one of load control modules 146, 148, 150 to connect the fixtures to the system. The opposite end of cable 106 also plugs directly into output port 126 of hub 102, the opposite end of cable 110 plugs directly into an output port of control module 146 and the opposite end of cable 114 also plugs directly into an output port of control module 148.

Figure 3:
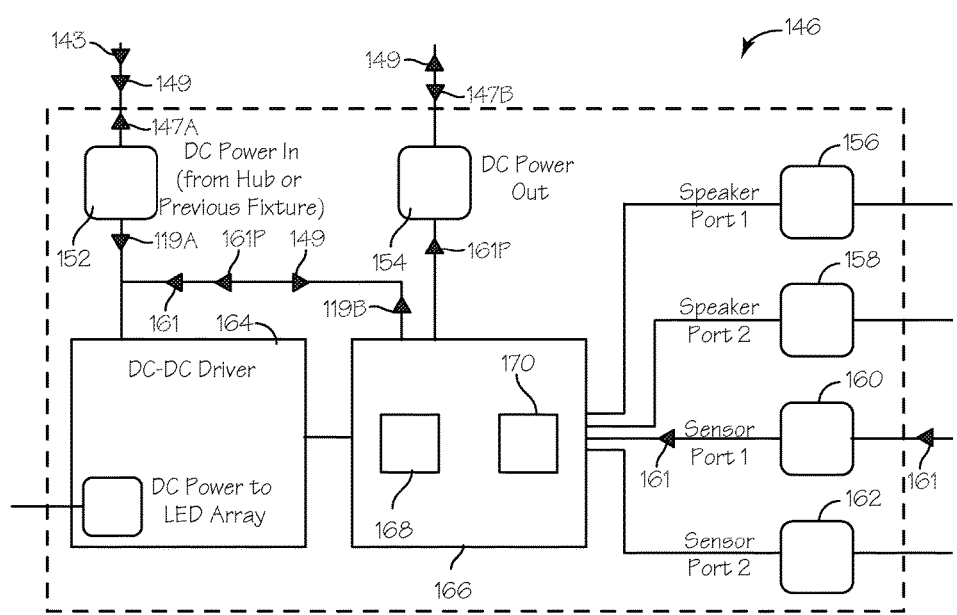
FIG. 3 is a schematic representation of a load control module in the power-distribution and control system shown in FIG. 1.

FIG. 3 shows a schematic representation of the load control module 146 shown in FIG. 2. Load control modules 148, 150 have the same or substantially the same construction as load control module 146. Load control module 146 includes an input port 152 for receiving a cable (in this case, cable 106). Load control module 146 receives DC power 143 and control signals 149 through input port 152 and also sends information monitoring signals 147A, sensor data 161 and processed sensor data 161P out from input port 152. Load control module 146 uses all or a subset of output ports to apply DC power 145 to any suitable secondary loads that are operatively connected to the fixture such as LED lights, occupancy sensors, environmental sensors, speakers, IT equipment, personal computers, charging receptacles (USB and wireless charging), displays, and potentially any DC load that is 60 VDC and below and draws less than 100 W. Load control module also includes an output port 154 for receiving a cable (in this case cable 110). Load control module serves as a conduit for transmitting DC power to one or more downstream devices (if such downstream devices are connected) through output port 154. Load control module also serves as a conduit for transmitting control signals 149 to the downstream devices and receiving monitoring information signals 147B from the downstream devices through output port 154.

Load control module 146 also includes one or more output ports for secondary loads such as speaker ports 156, 158 and sensor ports 160, 162. Each output port for secondary loads is for receiving a cable having the construction of cables 106, 110, 114 that is connected on its opposite ends to a secondary load such as a speaker, for example, a speaker that is used for sound-masking purposes in an office environment. Alternatively, output ports for secondary loads may be configured to use category 5 or category 6 cables to connect secondary loads such as speakers and sensors that have low current demands. In this way secondary loads such as speakers can be powered and controlled through the overall control system 100. Each sensor port is for receiving any suitable cable having the construction similar to cables 106, 110, 114 that is connected on its opposite ends to any suitable secondary load such as a sensor, for example, an occupancy, vacancy, daylight, or temperature sensor. In this way room monitoring sensors can be powered and controlled through the overall control system 100, and sensor data 161 from the sensor can be processed, used, or reported externally by the control system 100.

Load control module 146 further includes one or more primary load control drivers such as LED driver 164. Primary load control driver 164 regulates the DC voltage that is output to the primary load such as the LEDs in the light fixture and protects against voltage fluctuations, which can impact the light output by the LEDs. The LED driver provides a constant current output typically (but not necessarily) within the range of 20 mA to 750 mA and at a voltage range typically (but not necessarily) 12 VDC-60 VDC. The output of the LED driver powers one or more LED arrays at a certain level of illumination. The output of the LED driver is tailored to the specific arrangement of LED arrays and the desired illumination level.

Load control modules such as modules 146, 148 and 150 may include the primary load control drivers such as LED driver 164 as integrated components as illustrated or the load control drivers may be separate modular components that can be closely coupled or connected via a wire harness or any suitable bus interface that supports power & data such as a USB interface. The use of separate drivers permits pairing a load control module with a wider variety of dc/dc driver products that are either for LED arrays or powering other suitable loads.

Load control module 146 also includes a controller 166 having a memory 168 and one or more programmable microprocessors such as microprocessor 170. The controller 166 receives and processes control signals through input port 152 and controls the LED driver 164, any connected speaker, and any connected sensors accordingly. Additionally, controller 166 receives sensor data such as sensor data 161 from any sensors connected to the load control module and can process that data as desired or can forward processed sensor data 161P to another device on the system. The controller 166 utilizes a hardware unique MAC address to indicate its model number, role, functionality, and logical hierarchy for digital communications within system 100. Controller 166 is addressed within system 100 through its MAC address. Controller 166 can control the current and voltage output by LED driver 164 to change the brightness of the LEDs. This regulation can be based upon control signals received by the controller 166 that have been transmitted through system 100. Illumination levels throughout the driver's full dynamic brightness range are commanded through means including 0-10V analog signals or direct digital communication to controller 166 or by methods such as universal asynchronous receiver/transmitter (UART), Serial Peripheral Interface (SPI), Inter-Integrated Circuit (I2C), Digital Addressable Lighting Interface (DALI), or Digital Multiplex (DMX) protocols.

Figure 4A:
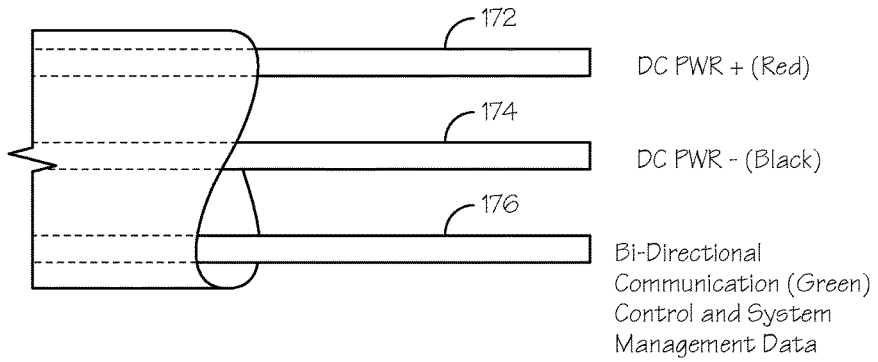
FIGS. 4A and 4B are schematic representations of the conductors inside the cables connecting components in the power distribution and control system of FIG. 1.
Figure 4B:
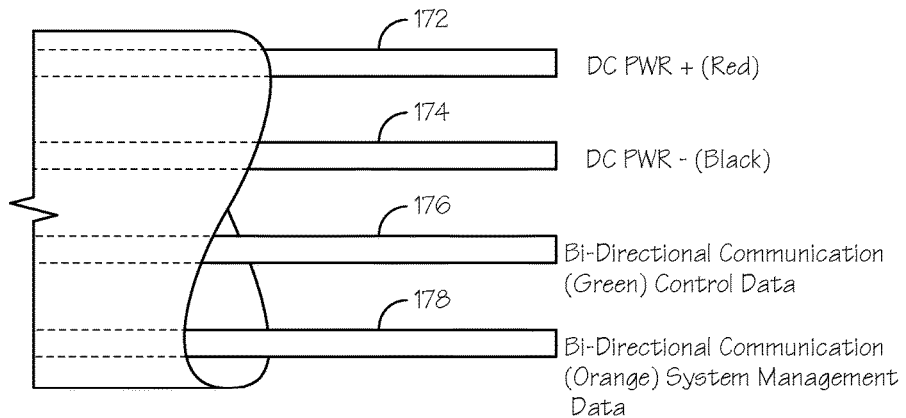

FIGS. 4a and 4b schematically depict two different wire configurations for the cables used in system 100, such as cables 106, 110, 114. Unlike systems that use established standards, such as POE, for transmitting power and data over a single cable, system 100 does not use cables that are widely used for data transmission, such as Category 5 or 6 cable. The Institute of Electrical and Electronics Engineers (IEEE) type 2 POE standard limits the current in Category 5 cables to 600 ma per pair with a maximum power available of 25.5 watts. Thus, POE is incapable of providing the DC power available from system 100. The use of larger diameter conductors limit power loss in the cables of system 100 and thus permits daisy-chained configurations. The resistance of the wires in Cat 5 or 6 cable lead to unacceptable power losses in such a configuration.

FIG. 4A shows a three-wire configuration. First wire 172 is a positive power wire. Second wire 174 is a negative power wire. Third wire 176 conducts bidirectional communication of control signals and system-management data such as control signals 149, information monitoring signals 147A, sensor data 161 and processed sensor data 161P. A fourth wire providing a ground for the communication and control channel is not required. Second wire 174 acts as a common ground for both the power circuit and the communication and control circuit. Preferably, wires 172-76 have a gauge of AWG 18 (wire diameter of 0.0403 in.) or larger. In comparison, Cat 5 and Cat 6 cables have wire diameters of 0.02503 in. and smaller.

FIG. 4B shows a four-wire configuration. In this configuration the control signals are delivered on wire 176 and the system management data is delivered on additional wire 178. Wires 453 and 454 (as well as wire 451) share wire 452 as a ground wire. Cables providing three or four AWG 18 wires can currently be purchased in bulk from a number of sources. An installer can then simply determine the amount of cable needed to connect two devices, cut out that length of cable, and then add connectors to the end of the cable on-site. The process of adding connectors to the end of a cable is known as "terminating" the cable. The use of field-terminable bulk cable in system 100 makes it possible to place devices in system 100 arbitrarily far apart from each other. The installer can simply cut out the length of bulk cable required to span the distance and then field-terminate that cable preventing or limiting service loops which can create power and communication-strength losses as well as have a negative effect on aesthetics.

Figure 5:
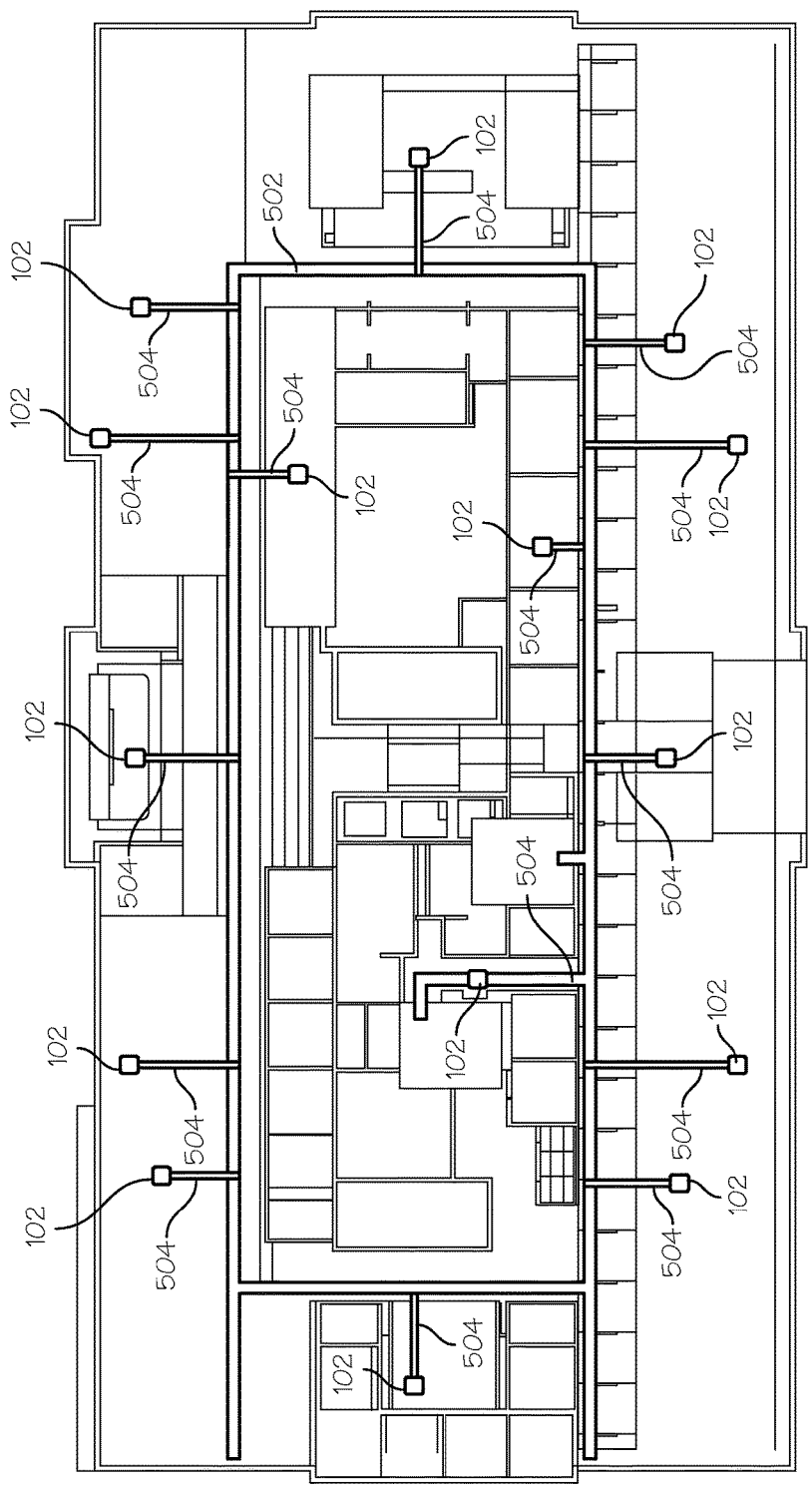
FIG. 5 is an exemplary building floor plan that depicts how the power-distribution and control system shown in FIG. 1 is connected to the AC power-distribution system running through the building.

FIG. 5 shows a schematic layout for a space 500. Space 500 may be a building, a floor of a building or a portion of a floor of a building. In FIG. 5, space 500 is shown as an entire floor of a building. A primary AC power pathway 502 traverses the floor. Secondary AC power pathways 504 connect hubs 102 to the primary AC power pathway. For example, one hub could be installed for every 2,500 square feet of space.

Figure 6:
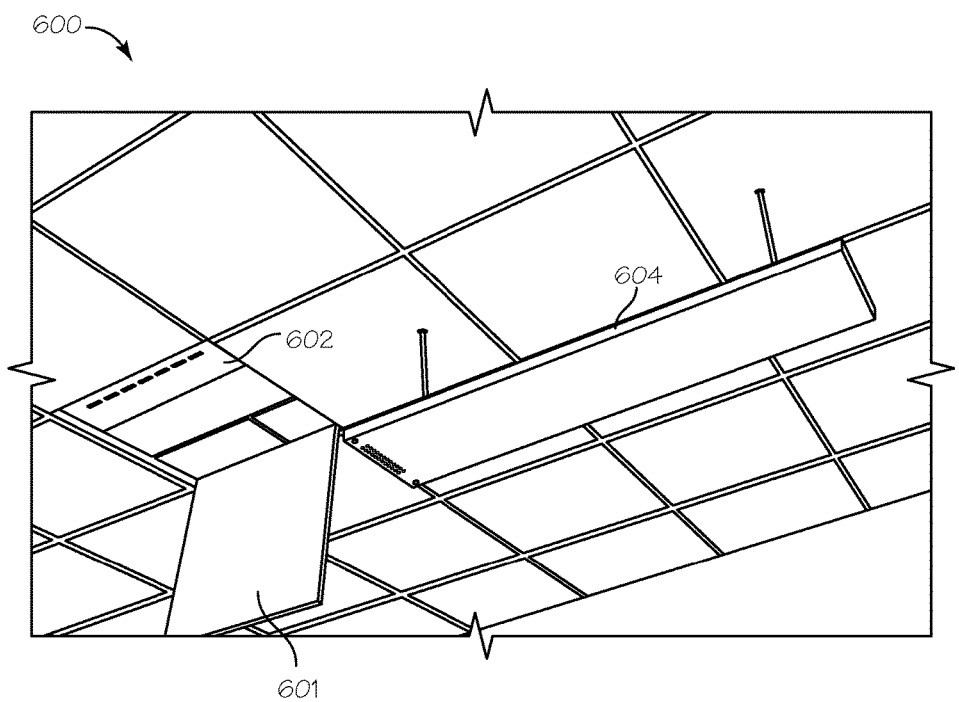
FIG. 6 is a perspective view of another power-distribution and control system.

FIG. 6 shows a perspective view of another power-distribution and control system 600. This system is similar to system 100 shown in FIG. 1, except that the hub 602 is mounted above the ceiling instead of below the ceiling so that hub 602 can be hidden from view. Hub 602 is dimensioned so that it can be inserted into the ceiling through the space taken up by a standard ceiling tile 601 for a commercial space. In this manner, hub 602 can be inserted into the ceiling from within the room by first removing the ceiling tile 601 at the appropriate installation location. Once the hub is installed in the ceiling, the ceiling tile can be replaced to hide the hub from view. The cable connecting hub 602 to fixture 604 can also be hidden by routing it through the mounting structure for fixture 604.

The disclosed power-distribution and control systems can route DC power, control signals, and sensor data among controllers regardless of how they are connected. The system is not topology-specific; it is topology agnostic. Devices such as light fixtures do not need to be connected directly to the hub. They can, instead, be daisy-chained together so long as combined they do not draw more power than a particular hub output channel can provide. For example, if a hub output can provide 100 W, then four devices each drawing 25 W can be connected to that output in a series fashion. Adding a fifth device that normally draws 25 W, would overload the output unless the devices contain circuitry or software that permits them to reduce their power draw (resulting in less brightness, for example, for a light) or coordinate the timing of their loads to keep the peak below the output channel rating upon the detection of an overload condition.

Additionally, hubs in power distribution and control system 100 such as hub 102 can communicate with any controller in the system even if it is not directly connected to them. Packets such as packets 119A and 119B are addressed to the MAC addresses of particular controllers, and intermediate controllers along the path from the source to destination do not serve as a barrier to successful transmission. In this sense the communication channel logically acts as a single communication wire, even though it may be physically made up of several wires through the daisy-chain connections. The controllers use transceivers such as transceiver 123 that can monitor incoming data for packets such as packets 119A or 119B addressed to them. The communications protocol for system 100 uses first-come first-serve priority and employs random-times for attempted retransmission when two load control modules send a packet at the same time such that there is a collision. The controllers can self-organize and establish hierarchies according to the principles set forth in U.S. Pat. No. 8,487,474 titled Method and Apparatus for Electrical Load Control Network, which patent is hereby incorporated by reference in its entirety.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A system for controlling and distributing DC power comprising:
   a power hub comprising
      a hub controller;
      a power converter adapted to convert AC power to DC power;
      one or more variable voltage regulators operatively connected to the power converter and controlled by the hub controller, the one or more variable voltage regulators are operable to provide regulated DC power to one or more primary loads and to receive and transmit data and control signals from and to the one or more primary loads;
      one or more communication interfaces operatively connected to the hub controller to transmit and receive data and control signals over a network;
   one or more primary loads, each primary load having a load control module, the load control module comprising:
      a load controller operatively connected to the hub controller to receive and transmit data and control signals to the hub controller;
      a plurality of output ports operatively connected to the load controller, the plurality of output ports adapted to provide DC power to secondary loads and to transmit and receive data and control signals to and from the load controller;
      a load driver adapted to distribute DC power to the secondary loads, the load driver operatively connected to and under control of the load controller.

\* \* \* \* \*